(12) United States Patent
Jaiswal et al.

(10) Patent No.: US 12,510,609 B2
(45) Date of Patent: Dec. 30, 2025

(54) MAGNETORESISTANCE ELEMENT INCLUDING A MULTI-LAYERED FREE LAYER STACK TO TUNE HYSTERESIS AND OUTPUT AMPLITUDE

(71) Applicant: Allegro MicroSystems, LLC, Manchester, NH (US)

(72) Inventors: Samridh Jaiswal, London (GB); Paolo Campiglio, Arcueil (FR)

(73) Assignee: Allegro MicroSystems, LLC, Manchester, NH (US)

( * ) Notice: Subject to any disclaimer, the term of this patent is extended or adjusted under 35 U.S.C. 154(b) by 127 days.

(21) Appl. No.: 18/440,322

(22) Filed: Feb. 13, 2024

(65) Prior Publication Data

US 2025/0258252 A1    Aug. 14, 2025

(51) Int. Cl.
| | |
|---|---|
| G01R 33/09 | (2006.01) |
| G01R 33/00 | (2006.01) |
| H10N 50/01 | (2023.01) |
| H10N 50/10 | (2023.01) |
| H10N 50/85 | (2023.01) |

(52) U.S. Cl.
CPC ......... *G01R 33/09* (2013.01); *G01R 33/0052* (2013.01); *H10N 50/01* (2023.02); *H10N 50/10* (2023.02); *H10N 50/85* (2023.02)

(58) Field of Classification Search
CPC ..... G01R 33/09; G01R 33/0052; H10N 50/10
USPC ...................................................... 324/252
See application file for complete search history.

(56) References Cited

U.S. PATENT DOCUMENTS

| | | | |
|---|---|---|---|
| 7,777,607 B2 | 8/2010 | Taylor et al. | |
| 8,907,390 B2 | 12/2014 | Reid | |
| 9,214,169 B1* | 12/2015 | Kaiser | G01R 33/098 |
| 9,741,372 B1 | 8/2017 | Campiglio | |
| 9,812,637 B2 | 11/2017 | Fermon et al. | |
| 9,995,798 B2 | 6/2018 | Bandiera | |
| 10,026,425 B2 | 7/2018 | Campiglio | |
| 10,050,193 B1 | 8/2018 | Klebanov et al. | |

(Continued)

OTHER PUBLICATIONS

U.S. Appl. No. 18/606,125, filed Mar. 15, 2024, Lassalle-Balier et al.

(Continued)

*Primary Examiner* — Roberto Velez
(74) *Attorney, Agent, or Firm* — Daly, Crowley, Mofford & Durkee, LLP (57) ABSTRACT

According to one aspect of the present disclosure, a magnetic field sensor includes a magnetoresistance (MR) element. In some embodiments, the MR element includes a reference layer, a free layer, and a barrier layer. In some embodiments the free layer includes two or more cobalt iron boron (CoFeB) layers, wherein a first one of the CoFeB layers is in contact with the barrier layer, and two or more spacer layers. In some embodiments, the CoFeB layers and the spacer layers alternate to form a multilayered free layer structure. In some embodiments, the magnetic field sensor comprises an angle sensor or a current sensor. In some embodiments, the contact between the first one of the CoFeB layers and the barrier layer is configured to reduce hysteresis in the MR element. In some embodiments, the alternating CoFeB layers and spacer layers are configured to increase output amplitude of the MR element.

22 Claims, 6 Drawing Sheets

(56) References Cited

U.S. PATENT DOCUMENTS

| | | |
|---|---|---|
| 10,119,988 B2 | 11/2018 | Alaoui |
| 10,620,279 B2 | 4/2020 | Campiglio et al. |
| 10,734,443 B2 | 8/2020 | Lassalle-Balier et al. |
| 10,753,989 B2 | 8/2020 | Campiglio et al. |
| 11,002,807 B2 | 5/2021 | Campiglio et al. |
| 11,022,661 B2 | 6/2021 | Lassalle-Balier et al. |
| 11,127,518 B2 | 9/2021 | Campiglio et al. |
| 11,193,989 B2 | 12/2021 | Campiglio et al. |
| 11,217,626 B2 | 1/2022 | Campiglio et al. |
| 11,630,168 B2 | 4/2023 | Lassalle-Balier et al. |
| 11,782,103 B2 | 10/2023 | Lassalle-Balier et al. |
| 11,852,699 B2 | 12/2023 | Lassalle-Balier et al. |
| 2011/0222333 A1* | 9/2011 | Ito ..................... H10N 50/10 365/158 |
| 2014/0117476 A1* | 5/2014 | Kuo ................... G11C 11/1675 257/421 |
| 2017/0125664 A1* | 5/2017 | Tahmasebi ............ H10N 50/80 |
| 2019/0259810 A1* | 8/2019 | Jacob .................... G11C 11/161 |
| 2020/0217907 A1* | 7/2020 | Raberg ................. G01R 33/093 |
| 2021/0201943 A1* | 7/2021 | Zheng ................... H10N 50/10 |
| 2021/0383953 A1 | 12/2021 | Campiglio et al. |
| 2023/0400537 A1 | 12/2023 | Lassalle-Balier et al. |
| 2024/0085463 A1 | 3/2024 | Jaiswal et al. |

OTHER PUBLICATIONS

U.S. Appl. No. 18/333,680, filed Jun. 13, 2023, Jaiswal.
U.S. Appl. No. 18/511,743, filed Nov. 16, 2023, Campiglio et al.
U.S. Appl. No. 18/470,538, filed Sep. 20, 2023, Solignac et al.
U.S. Appl. No. 18/294,283, filed Feb. 1, 2024, Timopheev et al.
U.S. Appl. No. 18/333,765, filed Jun. 13, 2023, Campiglio et al.
Guang et al., "Electrical Detection of Magnetic Skyrmions in a Magnetic Tunnel Junction"; Advanced Electronic Materials; Sep. 2022; 8 pages.

* cited by examiner

MAGNETORESISTANCE ELEMENT INCLUDING A MULTI-LAYERED FREE LAYER STACK TO TUNE HYSTERESIS AND OUTPUT AMPLITUDE

BACKGROUND

A magnetic field sensing element describes a variety of electronic elements that can sense a magnetic field. One such magnetic field sensing element is a magnetoresistance (MR) element. An MR element has a resistance that changes in relation to changes in a magnetic field experienced by the MR element. One such example of a MR element is a tunnel magnetoresistance (TMR) element. Another example is a giant magnetoresistance (GMR) element. Magnetic-field sensors may include bridges (e.g., a Wheatstone bridge). The bridges typically include four or more MR elements. MR elements in a bridge may include TMR elements. Each TMR element may include a plurality of pillars. Some MR elements may have a linear response range such that changes in resistance of the MR element is linear to changes in an applied magnetic field.

MR elements are used in magnetic field sensors. Magnetic field sensors are used in a variety of applications, including, but not limited to, an angle sensor that senses an angle of a direction of a magnetic field; a current sensor that senses a magnetic field generated by a current carried by a current-carrying conductor; a magnetic switch that senses the proximity of a ferromagnetic object; a rotation detector that senses passing ferromagnetic articles, for example, magnetic domains of a ring magnet or a ferromagnetic target (e.g., gear teeth) where the magnetic field sensor is used in combination with a back-biased or other magnet; a magnetic field sensor that senses a magnetic field density of a magnetic field, a linear sensor that senses a position of a ferromagnetic target; and so forth. For angle sensors, one consideration is angular accuracy. Accordingly, a desire for angle sensors is to obtain magnetic sensors with improved angular accuracy.

There are multiple contributions to the total angle error (e.g., orthogonality, amplitude mismatch, hysteresis etc.). A potential impediment on the movement of the free layer is hysteresis, which is a magnetic phenomenon that impairs this ideal tracking of the free layer with the external field to be sensed. Hysteresis is the relative difference between a forward and a reverse angular (or field) sweep at a given field (or angle). A larger difference results in low accuracy and/or high error. For TMR and GMR based current sensors the ideal response is one which is non-hysteretic, whereby the response to an external field for both forward and reverse directions is perfectly linear. Hysteresis in the response curve for current sensors contributes to sensing inaccuracies. Hysteresis is a contributor to angle error specifically at low fields within the operating region.

SUMMARY

According to one aspect of the present disclosure, a magnetic field sensor includes a magnetoresistance (MR) element. In some embodiments, the MR element includes a reference layer, a free layer, and a barrier layer. In some embodiments, the free layer includes two or more cobalt iron boron (CoFeB) layers, wherein a first one of the CoFeB layers is in contact with the barrier layer, and two or more spacer layers. In some embodiments, the CoFeB layers and the spacer layers alternate to form a multilayered free layer structure. In some embodiments, the magnetic field sensor comprises an angle sensor or a current sensor. In some embodiments, the contact between the first one of the CoFeB layers and the barrier layer is configured to reduce hysteresis in the MR element. In some embodiments, the alternating CoFeB layers and spacer layers are configured to increase output amplitude of the MR element.

According to one aspect of the present disclosure, a method includes manufacturing a magnetic field sensor. In some embodiments, the manufacturing includes forming a magnetoresistance (MR) element. In some embodiments, forming the MR element includes forming a reference layer, forming a barrier layer, and forming a free layer. In some embodiments, forming the free layer includes depositing two or more cobalt iron boron (CoFeB) layers, wherein a first one of the CoFeB layers is in contact with the barrier layer, and depositing two or more spacer layers. In some embodiments, the CoFeB layers and the spacer layers alternate to form a multilayered free layer structure. In some embodiments, manufacturing the magnetic field sensor includes manufacturing the magnetic field sensor as an angle sensor or a current sensor. In some embodiments, the contact between the first one of the CoFeB layers and the barrier layer is configured to reduce hysteresis in the MR element. In some embodiments, the alternating CoFeB layers and spacer layers are configured to increase output amplitude of the MR element.

DESCRIPTION OF THE SEVERAL VIEWS OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principals of the concepts described herein. Like reference numerals designate corresponding parts throughout the different views. Furthermore, embodiments are illustrated by way of example and not limitation in the figures, in which.

DETAILED DESCRIPTION

Figure 1:
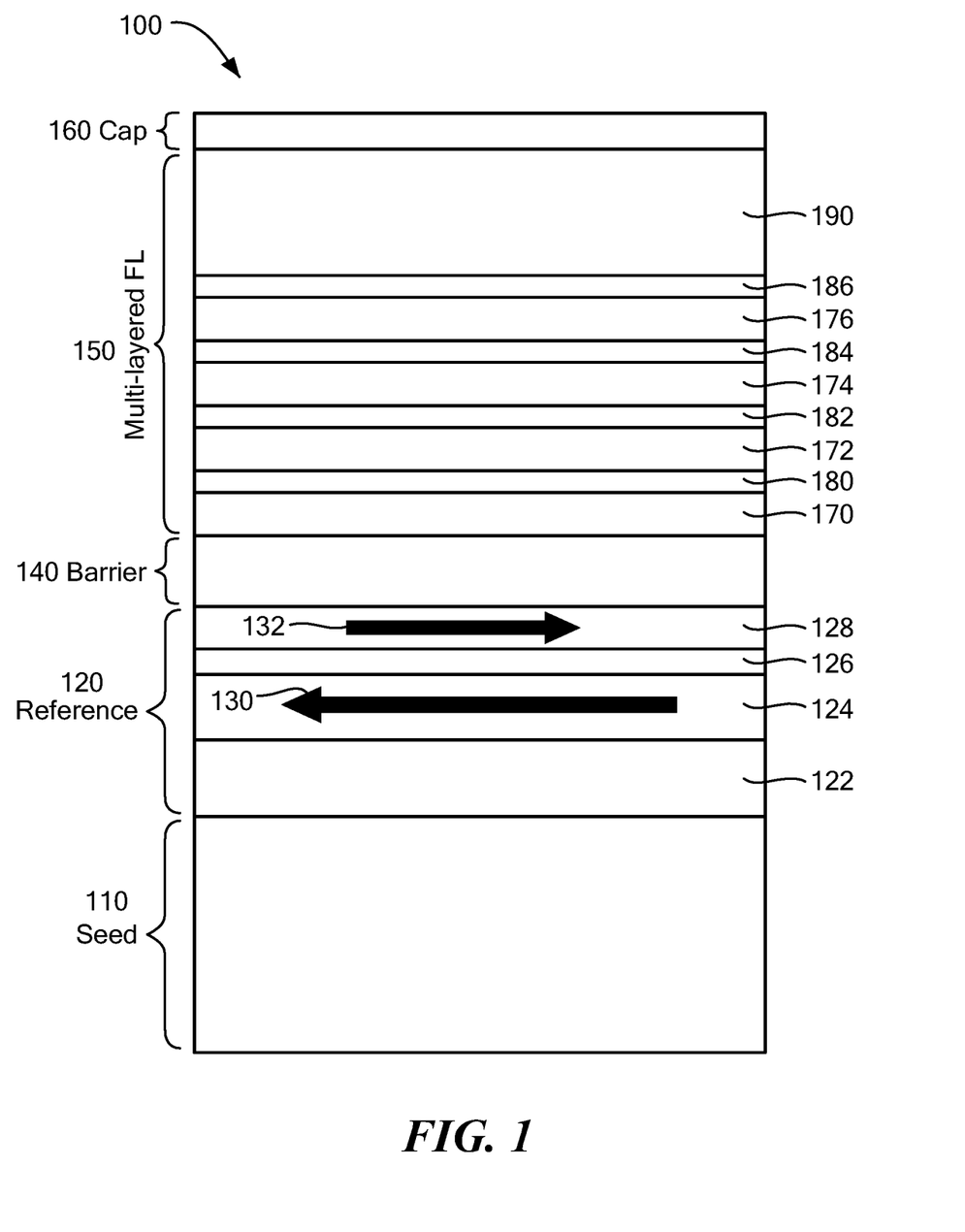
FIG. 1 is an example stack up for a magnetoresistance (MR) element that includes two or more cobalt iron boron (CoFeB) layers and two or more spacer layers that alternate to form a multilayered free layer structure.

FIG. 1 shows an example of a magnetoresistance (MR) element 100 configured to detect changes in a magnetic field intensity of an external magnetic field. The MR element 100 changes resistance in response to a change in an applied magnetic field. The MR element 100 may be configured as a single pillar as shown in FIG. 1 or as multiple pillars. The MR element 100 includes a free layer 150 configured to remain free or not fixed or pinned. Accordingly, the free layer 150 is able to track or follow changes in directions or amplitude of external field. The more precisely the free layer 150 can track the external field the more accurately the sensor performs.

The MR element 100 includes: a seed layer 110; a reference layer 120 on the seed layer 110; a barrier layer 140 on the reference layer 120; a free layer 150 on the barrier layer 140; and a cap layer 160 on the free layer 150. In the illustrated example embodiment, the free layer 150 comprises two or more cobalt iron boron (CoFeB) layers 170, 172, 174, 176, and two or more spacer layers 180, 182, 184, 186. The CoFeB layers and the spacer layers alternate to form the free layer structure, with a first one of the CoFeB layers 170 in contact with a barrier layer 140. The barrier layer 140 on the reference layer 120 may comprise magnesium oxide (MgO) having a thickness of about 2 nm+/−0.25 nm thick.

In one particular embodiment, the free layer 150 includes: a first one of the spacer layers 180 on the first one of the CoFeB layers 170; a second one of the CoFeB layers 172 on the first one of the spacer layers 180; a second one of the spacer layer 182 on the second one of the CoFeB layers 172; a third one of the CoFeB layers 174 on the second one of the spacer layers 182; a third one of the spacer layers 184 on the third one of the CoFeB layers 174; a fourth one of the CoFeB layers 176 on the third one of the spacer layers 184; and a fourth one of the spacer layers 186 on the fourth one of the CoFeB layers 176.

The contact between the first one of the CoFeB layers 170 and the barrier layer 140 is configured to reduce hysteresis in the MR element by reducing the thickness of the CoFeB layers. In example embodiments, the CoFeB layers have a thickness ranging from 0.5 nm+/−0.25 nm to about 1 nm+/−0.25 nm. The reduction of hysteresis is achieved, in part, by selecting the thickness of the first one of the CoFeB layers 170. In embodiments, reducing the CoFeB thickness in comparison to conventional CoFeB layer thickness lowers the hysteresis contribution to the angle error. In an example embodiment, the first one of the CoFeB layers 170 has a thickness of about 0.5 nm (+/−0.25 nm) to about 1 nm (+/−0.25 nm).

The alternating CoFeB layers and spacer layers are configured to increase output amplitude of the MR element 100. The positioning of the spacer layers within the CoFeB as well as the number of repetitions of the CoFeB layer and spacer layers tunes the response of the MR element 100. The signal amplitude of the MR element 100 can be increased by increasing the number of repetitions of the CoFeB layer and spacer layers. The spacer layers are alternating in-between the CoFeB layers such that the total effective thickness of the free layer 150 is sufficient to generate the desired output amplitude, while the first one of the CoFeB layers 170 is thin enough to obtain the lower hysteretic contribution. The spacer layers are placed a sufficient distance from the barrier layer 140 such that the interface between the first one of the CoFeB layers 170 and the barrier layer 140 is preserved. This allows for sufficient coherent tunneling of $3d$ electrons and thereby generates the desired output amplitude.

The spacer layers comprise a non-magnetic material, such as tantalum having a thickness of about 0.1 nm (+/−0.1 nm) to about 0.2 nm (+/−0.1 nm). In an embodiment, such as MR element 100, the first one of the spacer layers 180, the second one of the spacer layers 182, and the third one of the spacer layers 184 are 0.1 nm thick, while the fourth one of the spacer layers 186 is 0.2 nm thick. The first one of the CoFeB layers 170 may have a thickness that is less than a second one of the CoFeB layers 172. In an embodiment, such as MR element 100, the first one of the CoFeB layers 170 is 1 nm thick, while the second one of the CoFeB layers 172, the third one of the CoFeB layers 174, and the fourth one of the CoFeB layers 176 are 0.5 nm thick. In an embodiment, such as the MR element 100, the MR element has four CoFeB layers and four spacer layers. The MR element may have other numbers of CoFeB layers and spacer layers. For example, the MR element may have two CoFeB layers and two spacer layers.

In addition to the thickness, the ratio of cobalt, iron, and boron that comprise the CoFeB layers may be changed. The ratio changes adjust the amount of spin polarization, resulting in different MR outputs for a given thickness. Further, the saturation magnetization also changes which affects the anisotropy of the CoFeB by changing the ratio the magnetic field at which the material saturates also changes. The higher the saturation, the higher the field. In an embodiment, the CoFeB layers comprise a ratio of 40% cobalt, 40% iron, and 20% boron. In an embodiment, the CoFeB layers comprise a ratio of 20% cobalt, 60% iron, and 20% boron. In another embodiment, the CoFeB layers comprise a ratio of 60% cobalt, 20% iron, and 20% boron.

In embodiments, the free layer 150 further comprises a NiFe layer 190 on the fourth one of the spacer layers 186. The NiFe layer 190 comprises nickel iron (NiFe) having a thickness of about 6 nm (+/−1 nm) to about 80 nm (+/−1 nm).

The seed layer 110 may be disposed or otherwise provided upon a substrate (e.g., a silicon substrate). In one example, the seed layer 110 is a non-magnetic material (e.g., copper nitride (CuN)).

In one example, the reference layer 120 on the seed layer 110 includes: a antiferromagnetic layer 122 on the seed layer 110; a ferromagnetic layer 124 on the antiferromagnetic layer 122; a spacer layer 126 on the ferromagnetic layer 124; and a ferromagnetic layer 128 on the spacer layer 126. For a TMR or GMR element used in an angle sensor or current sensor, the reference layer remains fixed and is pinned along a particular direction. The antiferromagnetic layer 122 is called a pinning layer and includes magnetization directions (not shown) that are antiparallel to each other. In one example, the antiferromagnetic layer 122 is platinum manganese, iridium manganese, and so forth having a thickness between about 7 nm (+/−1 nm) to about 18 nm (+/−1 nm).

In one example, the ferromagnetic layer 124 includes cobalt and has a magnetization direction 130. The ferromagnetic layer 124 is called a pinned layer as the magnetization direction 130 is pinned by the antiferromagnetic layer 122. The ferromagnetic layer 124 is cobalt iron having a thickness of about 2.3 nm (+/−0.25 nm).

The spacer layer 126 includes a nonmagnetic material such a metal, for example, ruthenium. Ruthenium allows for antiferromagnetic or ferromagnetic coupling (also called Ruderman Kittel Kasuya Yoshida (RKKY) coupling) between surrounding layers, according to the thickness of the ruthenium. RKKY coupling decreases and switches between a maximum antiferromagnetic coupling and a maximum ferromagnetic coupling as the thickness of the spacer layer 126 is increased. Accordingly, the ruthenium material permits coupling through the ruthenium material. In one particular example, the spacer layer 126 is ruthenium having a thickness of about 0.8 nm (+/−0.02 nm).

In one example, the ferromagnetic layer 128 includes CoFeB having a thickness of about 1 nm+/−0.25 nm. The ferromagnetic layer 128 has a magnetization direction 132 and is the reference direction of the MR element 100. The reference direction is the direction the MR element 100 has the most changes in resistivity with changes in a detected magnetic field. In one particular example, the antiferromagnetic layer 122 is cobalt iron boron having a thickness of about 1.0 nm+/−0.25 nm. The magnetization direction 132 may be parallel or antiparallel to the magnetization direction 130 depending on the thickness of the spacer layer 126. The cap layer 160 on the free layer 150 may be made from a nonmagnetic or diamagnetic material (e.g., Ta, Cu or Ru) and may be about 10 nm (+/−0.5 nm) thick.

Figure 2:
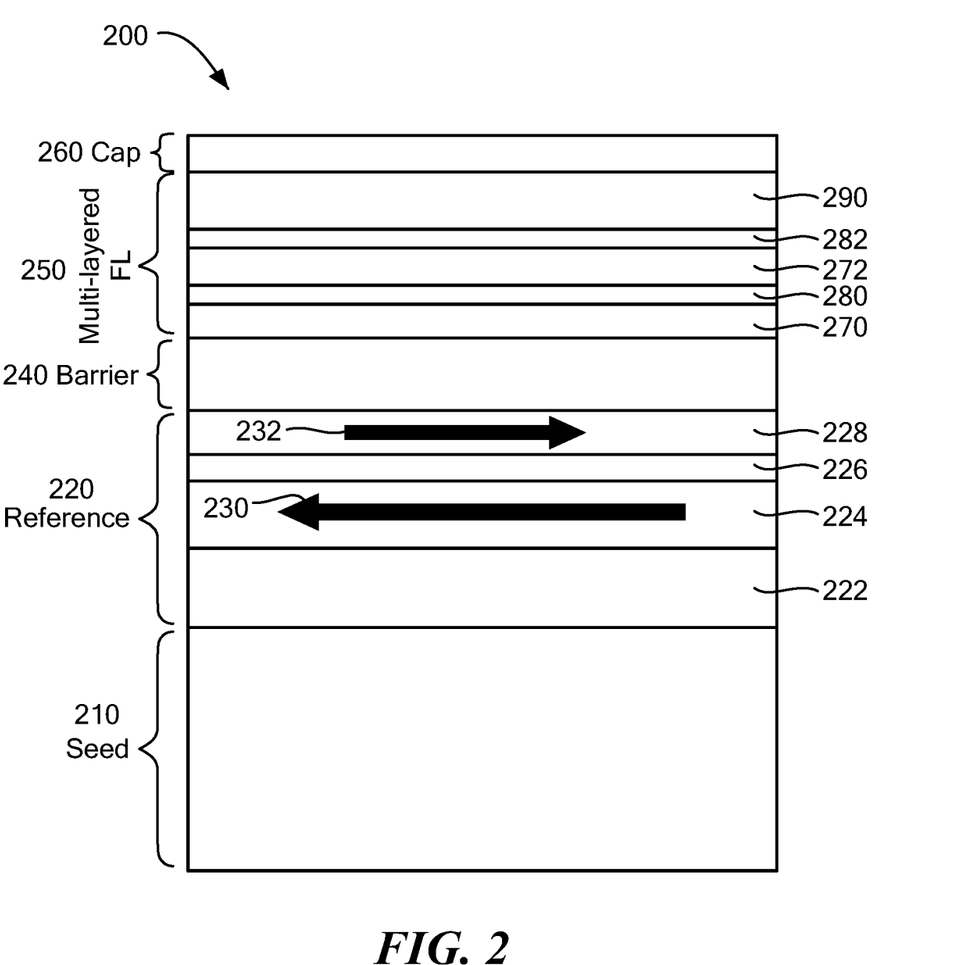
FIG. 2 is an example stack up for a MR element configured as an angle sensor that includes two CoFeB layers and two spacer layers that alternative to form a multilayered free layer structure.
Figure 3:
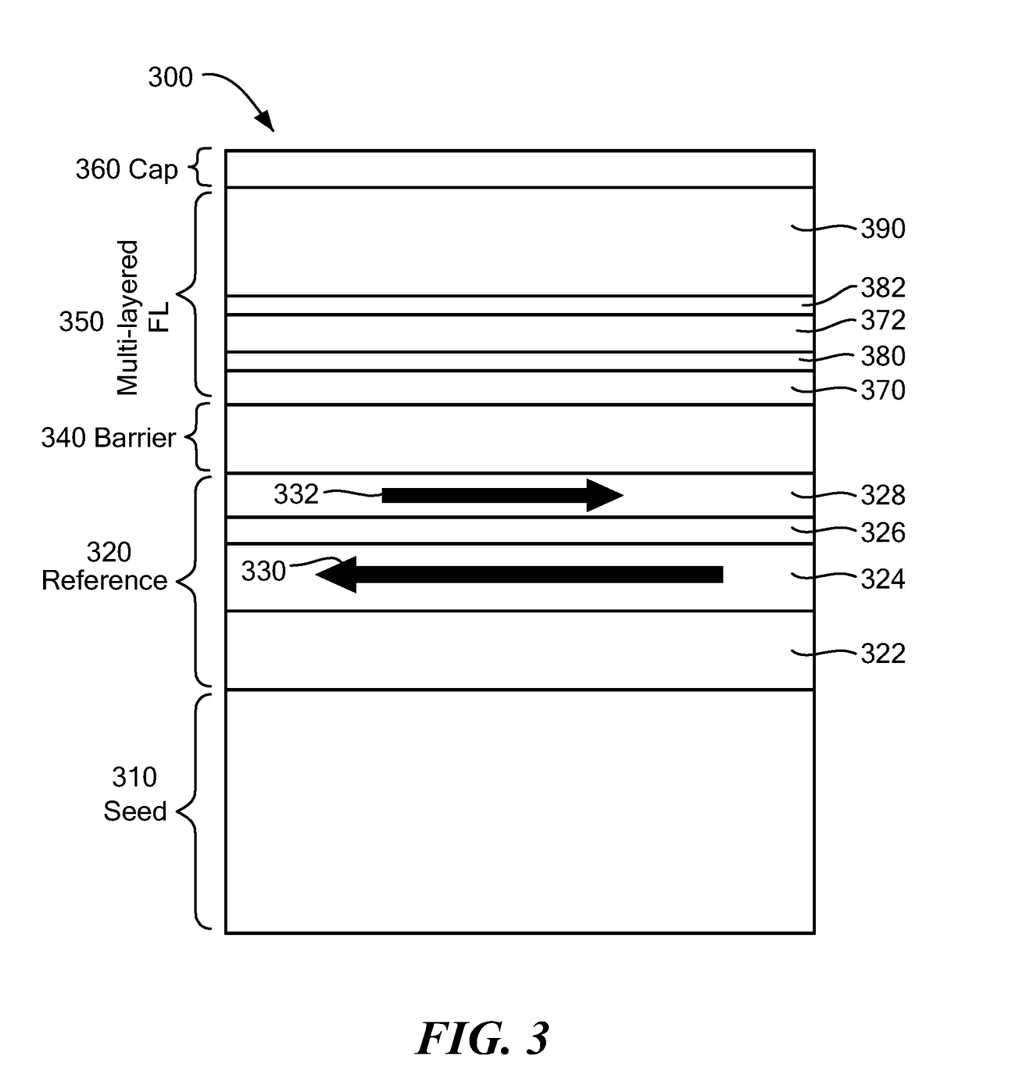
FIG. 3 is an example stack up for a MR element configured as a current sensor that includes two CoFeB layers and two spacer layers that alternative to form a multilayered free layer structure.

FIG. 2 shows an example MR element 200 configured for an angle sensor with two CoFeB layers and two spacer layers that alternate to form a multilayered free layer structure. FIG. 3 shows an example of MR element 300 configured for a current sensor with two CoFeB layers and two spacer layers that alternative to form a multilayered free layer structure. Each MR element 200, 300 includes a free layer 250, 350 including a NiFe layer 290, 390. The thickness of the NiFe layer 290, 390 may be selected to provide a magnetic field sensor configured as an angle sensor or a current sensor.

For angle-based sensors, the MR element 200 angular hysteresis is reduced by the multilayered free layer structure allowing for a more accurate angular response. In the illustrated embodiment, the MR element 200 includes: a seed layer 210; a reference layer 220 on the seed layer 210; a barrier layer 240 on the reference layer 220; a free layer 250 on the barrier layer 240; and a cap layer 260 on the free layer 250. The seed layer 210, reference layer 220, barrier layer 240, and cap layer 260 maybe similar to or the same as the seed layer 110, reference layer 120, barrier layer 140, and cap layer 160 disclosed in FIG. 1.

The reference layer 220 includes: a antiferromagnetic layer 222 on the seed layer 210; a ferromagnetic layer 224 on the antiferromagnetic layer 222; a spacer layer 226 on the ferromagnetic layer 224; and a ferromagnetic layer 228 on the spacer layer 226. The ferromagnetic layer 224 may be referred to as a pinned layer as the magnetization direction 230 is pinned by the antiferromagnetic layer 222. The ferromagnetic layer 228 has a magnetization direction 232 that provides a reference direction of the MR element 200, which is not shown.

The free layer 250 includes two or more cobalt iron boron (CoFeB) layers 270, 272, two or more spacer layers 280, 282, and a NiFe layer 290. The NiFe layer 290 may be made from nickel iron (NiFe) having a thickness of about 6 nm (+/−1 nm). The CoFeB layers and the spacer layers alternative to form the free layer structure, with a first one of the CoFeB layers 270 is in contact with the barrier layer 240.

The free layer 250 includes: a first one of the spacer layers 280 on the first one of the CoFeB layers 270; a second one of the CoFeB layers 272 on the first one of the spacer layers 280; and a second one of the spacer layers 282 on the second one of the CoFeB layers 272. The CoFeB layers have a thickness of about 0.5 nm+/−0.25 nm to about 1 nm (+/−0.25 nm) thick. The spacer layers comprise a non-magnetic material, such as tantalum having a thickness of about 0.1 nm (+/−0.1 nm) to about 0.2 nm (+/−0.1 nm).

In an embodiment, a second one of the CoFeB layers 272 has a thickness that is less than the first one of the CoFeB layers 270. In such an embodiment, such as MR element 200, the first one of the CoFeB layers 270 is 1 nm thick, while the second one of the CoFeB layers 272 is 0.5 nm thick. The first one of the spacer layers 280 is 0.1 nm thick, while the second one of the spacer layers 282 is 0.2 nm thick.

For current-based sensors, such as the MR element 300, the field sweep based hysteresis is reduced by the multilayered free layer structure providing for a more accurate linear response. The MR element 300 includes: a seed layer 310; a reference layer 320 on the seed layer 310; a barrier layer 340 on the reference layer 320; a free layer 350 on the barrier layer 340; and a cap layer 360 on the free layer 250. The seed layer 310, reference layer 320, barrier layer 340, and cap layer 360 maybe similar to or the same as the seed layer 110, reference layer 120, barrier layer 140, and cap layer 160 in FIG. 1.

The reference layer 320 includes: a antiferromagnetic layer 322 on the seed layer 310; a ferromagnetic layer 324 on the antiferromagnetic layer 322; a spacer layer 326 on the ferromagnetic layer 324; and a ferromagnetic layer 328 on the spacer layer 326. The ferromagnetic layer 324 is called a pinned layer as the magnetization direction 330 is pinned by the antiferromagnetic layer 322. The ferromagnetic layer 328 has a magnetization direction 332 and is the reference direction of the MR element 300, which is not shown.

The free layer 350 includes: two or more cobalt iron boron (CoFeB) layers 370, 372, two or more spacer layers 380, 382, and a vortex layer 390. The vortex layer 390 may be made from nickel iron (NiFe) having a thickness of about 80 nm (+/−1 nm). According to an aspect of the disclosure, the thickness of the NiFe layer induces a vortex in the vortex layer 390. Illustrative vortexes that may be used within MR element 300 are described, for example, in co-pending U.S. patent application Ser. No. 17/806,336, having Publication No. US2023/0400537 and entitled "Magnetic Field Current Sensor to Reduce Stray Magnetic Fields" which is hereby incorporated by reference in its entirety. The CoFeB layers and the spacer layers alternate to form the free layer structure, with a first one of the CoFeB layers 370 is in contact with the barrier layer 340.

The free layer structure includes a first one of the spacer layers 380 on the first one of the CoFeB layers 370; a second one of the CoFeB layers 372 on the first one of the spacer layers 380; and a second one of the spacer layers 382 on the second one of the CoFeB layers 372. The CoFeB layers have a thickness of about 0.5 nm (+/−0.25 nm) to about 1 nm (+/−0.25 nm). The spacer layers comprise a non-magnetic material, such as tantalum having a thickness of about 0.1 nm (+/−0.1 nm) to 0.2 nm (+/−0.1 nm).

In an embodiment, a second one of the CoFeB layers 372 has a thickness that is less than the first one of the CoFeB layers 370. In such an embodiment, such as MR element 300, the first one of the CoFeB layers 370 is 1 nm thick, while the second one of the CoFeB layers 372 is 0.5 nm thick. The first one of the spacer layers 380 is 0.1 nm thick, while the second one of the spacer layers 382 is 0.2 nm thick.

Figure 4:
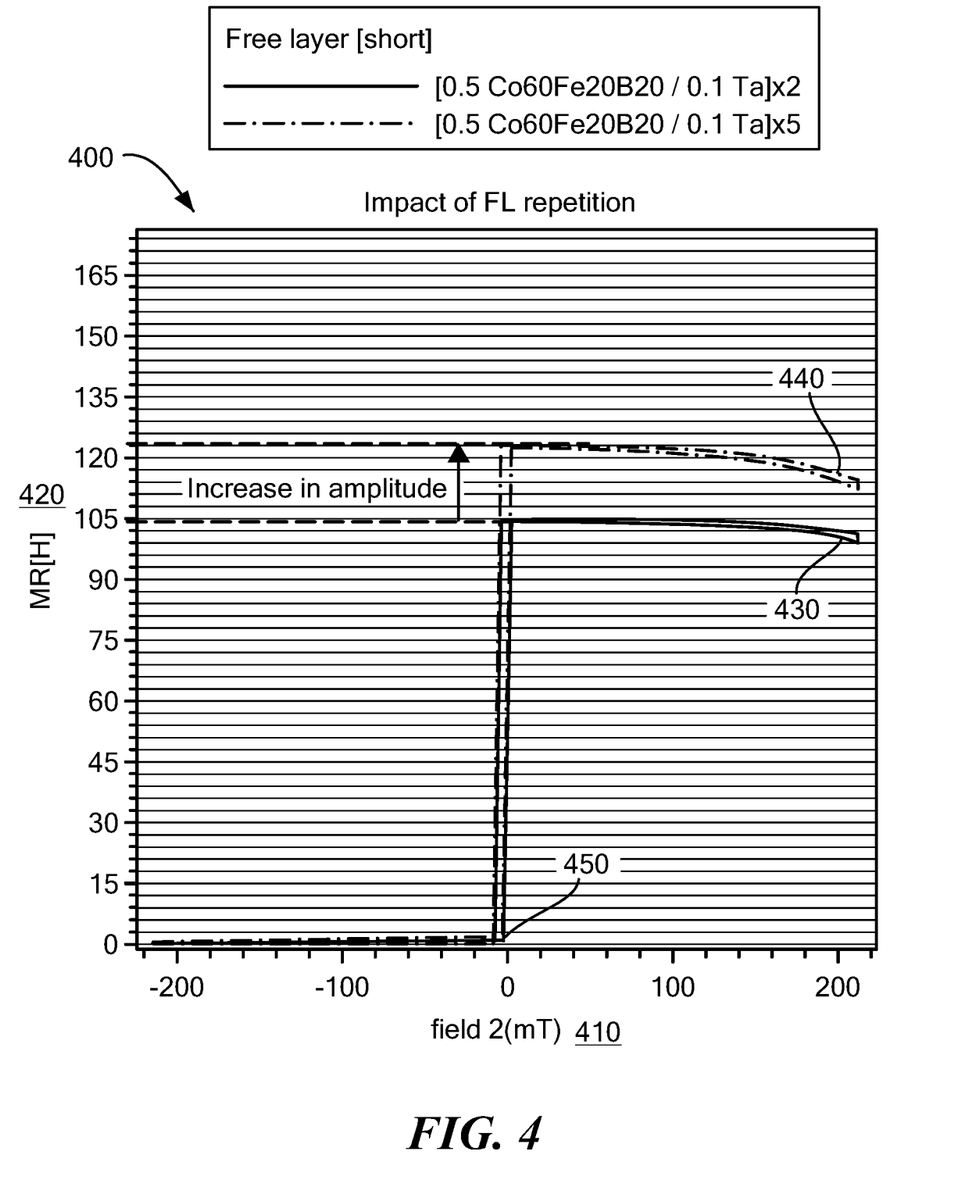
FIG. 4 is a graph disclosing a field (mT) vs. an output amplitude (h)

FIG. 4 is a graph 400 of field (mT) 410 vs. an output amplitude (h) 420 for a first MR element 430 with a multilayered free layer structure having two repetitions of CoFeB layers and spacer layers, which alternate to form the free layer structure and a second MR element 440 with a multilayered free layer structure having five repetitions of CoFeB layers and spacer layers, which alternate to form the free layer structure. The CoFeB layers and spacer layers that make up the structures of the MR elements 430, 440 have the same size and the CoFeB layers have the same composition. The CoFeB layers have a thickness of 0.5 nm and the spacer layers have a thickness of 0.1 nm. The CoFeB layers comprise a ratio of 60% cobalt, 20% iron, and 20% boron. As demonstrated by graph 400, increasing the number of repetitions of CoFeB layers and spacer layers increases the total output amplitude of the MR element.

Figure 5:
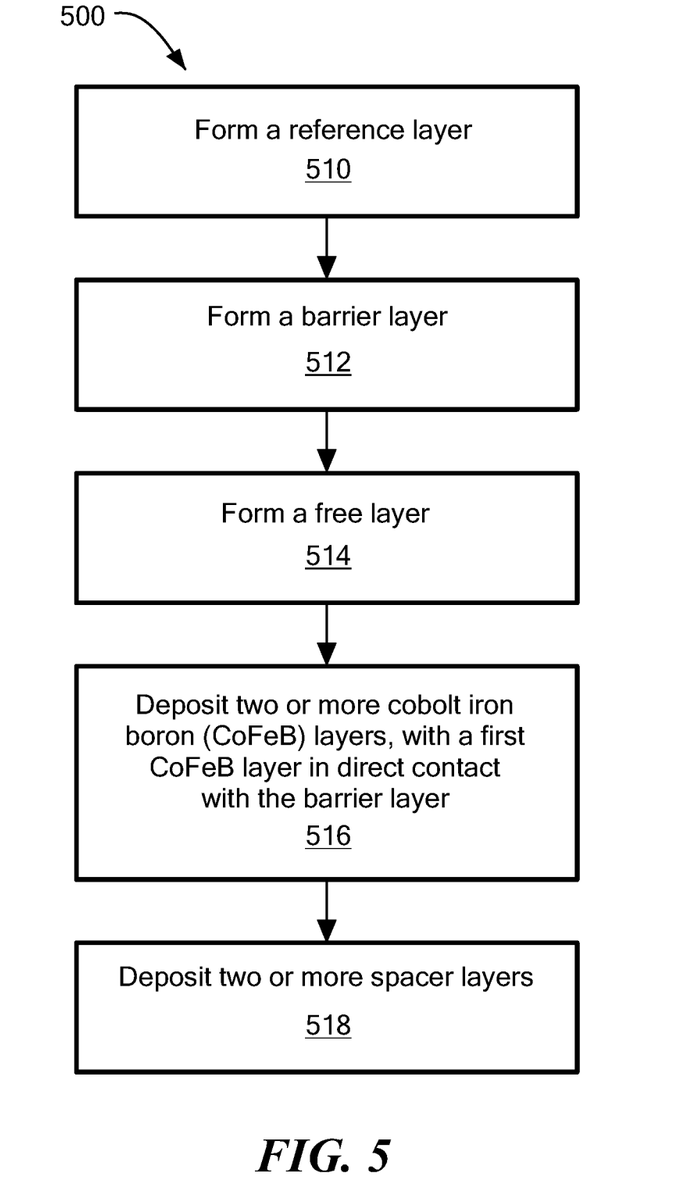
FIG. 5 is a flowchart showing an example of a process for forming an MR element, such as the MR element in FIG. 1.

FIG. 5 shows a flowchart of example of a process 500 for forming an MR element, such as the MR element 100 in FIG. 1. Process 500 forms a reference layer in block 510. Process 500 forms a barrier layer in block 512. Process 500 forms a free layer in block 514. Process 500 deposits two or more cobalt iron boron (CoFeB) layers, with a first CoFeB layer is in direct contact with the barrier layer in block 516. Process 500 deposits two or more spacer layers in block 518. The CoFeB layers and the spacer layers alternate to form a multilayered free layer structure.

Figure 6:
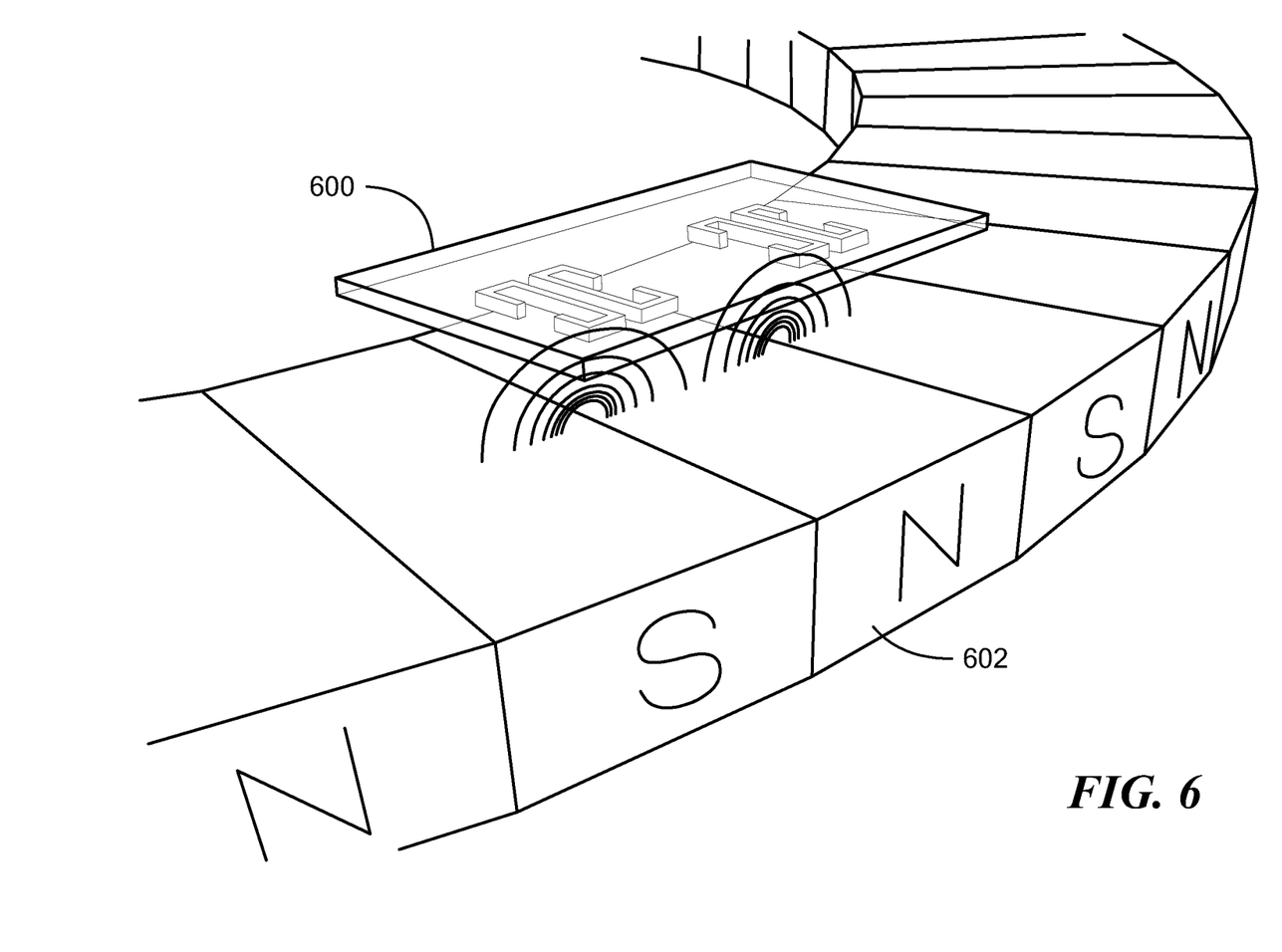
FIG. 6 is a block diagram of a MR element configured as a magnetic field sensor placed above a magnetic target for rotational speed measurement.

Referring now to FIG. 6, a magnetic field sensor 600 can include one or more magnetoresistance elements. Here, four magnetoresistance elements, which can be of a type described above in conjunction with FIG. 1, are arranged over a common substrate. The four magnetoresistance elements can be arranged in a bridge. Other electronic components (not shown), for example, amplifiers and processors, i.e., an electronic circuit, can also be integrated upon the common substrate. In some embodiments, the electronic circuit can generate an output signal indicative of a movement, e.g., a rotation, of an object, e.g., 602.

A surrounding package (not shown) e.g., a plastic package, can surround or otherwise be included with the magnetic field sensor 600. Also, a leadframe (not shown) can be coupled to or otherwise be included with the magnetic field sensor 600.

The magnetic field sensor 600 can be disposed proximate to a moving magnetic object, for example, a ring magnet 602 having alternating north and south magnetic poles. The ring magnet 602 is subject to rotation.

The magnetic field sensor 600 can be configured to generate an output signal indicative of at least a speed of rotation of the ring magnet. In some arrangements, the ring magnet 602 is coupled to a target object, for example, a cam shaft in an engine, and the sensed speed of rotation of the ring magnet 602 is indicative of a speed of rotation of the target object. While the magnetic field sensor 600 is used as a rotation detector, it should be understood that other similar magnetic field sensors, for example, current sensors, having one or more the magnetoresistance elements of FIG. 1 can also be realized.

Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

Although reference is made herein to particular materials, it is appreciated that other materials having similar functional and/or structural properties may be substituted where appropriate, and that a person having ordinary skill in the art would understand how to select such materials and incorporate them into embodiments of the concepts, techniques, and structures set forth herein without deviating from the scope of those teachings.

Various embodiments of the concepts, systems, devices, structures and techniques sought to be protected are described herein with reference to the related drawings. Alternative embodiments can be devised without departing from the scope of the concepts, systems, devices, structures and techniques described herein. It is noted that various connections and positional relationships (e.g., over, below, adjacent, etc.) are set forth between elements in the following description and in the drawings. These connections and/or positional relationships, unless specified otherwise, can be direct or indirect, and the described concepts, systems, devices, structures and techniques are not intended to be limiting in this respect. Accordingly, a coupling of entities can refer to either a direct or an indirect coupling, and a positional relationship between entities can be a direct or indirect positional relationship.

As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s). The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration. Any embodiment or design described herein as "exemplary" is not necessarily to be construed as preferred or advantageous over other embodiments or designs. The terms "one or more" is understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment, "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal, "top," "bottom," and derivatives thereof shall relate to the described structures and methods, as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. A magnetic field sensor, comprising:
   a magnetoresistance (MR) element including:
      a reference layer, a free layer, and a barrier layer;
      wherein the free layer comprises:
         two or more cobalt iron boron (CoFeB) layers, wherein a first one of the CoFeB layers is in contact with the barrier layer and a second one of the CoFeB layers has a thickness that is less than the first one of the CoFeB layers, wherein the contact between the first one of the CoFeB layers and the barrier layer is configured to reduce hysteresis in the MR element; and
         two or more spacer layers,
      wherein the CoFeB layers and the spacer layers alternate to form a multilayered free layer structure.

2. The sensor of claim 1, wherein the magnetic field sensor comprises an angle sensor or a current sensor.

3. The sensor of claim 1, wherein the first one of the CoFeB layers in direct contact with the barrier layer has a thickness of about 0.5 nanometers to about 1 nanometers.

4. The sensor of claim 1, wherein the alternating CoFeB layers and spacer layers are configured to increase output amplitude of the MR element.

5. The sensor of claim 1, wherein the MR element has four CoFeB layers and four spacer layers.

6. The sensor of claim 1, wherein the MR element has two CoFeB layers and two spacer layers.

7. The sensor of claim 1, wherein the spacer layers have a thickness of about 0.1 nanometers to about 0.2 nanometers.

8. The sensor of claim 1, wherein the CoFeB layers have a thickness of about 0.5 nanometers to about 1 nanometers.

9. The sensor of claim 1, wherein the MR element further comprises:
   a cap layer; and
   a seed layer, wherein the reference layer is located between the seed layer and the barrier layer, and wherein the free layer is located between the barrier layer and the cap layer.

10. The sensor of claim 1, wherein the free layer further comprises a NiFe layer disposed on the CoFeB layers and the spacer layers.

11. The sensor of claim 10, wherein the NiFe layer has a thickness of about 6 nanometers to about 80 nanometers.

12. The sensor of claim 1, wherein the CoFeB layers have a thickness greater than a thickness of the spacer layers.

13. The sensor of claim 1, wherein the CoFeB layers comprise a ratio of 40% cobalt, 40% iron, and 20% boron; a ratio of 20% cobalt, 60% iron, and 20% boron; or a ratio of 60% cobalt, 20% iron, and 20% boron.

14. A method, comprising:
   manufacturing a magnetic field sensor, the manufacturing comprising:
   forming a magnetoresistance (MR) element, wherein forming the MR element comprises:
      forming a reference layer;
      forming a barrier layer; and
      forming a free layer, wherein forming the free layer comprises:
         depositing two or more cobalt iron boron (CoFeB) layers, wherein a first one of the CoFeB layers is in contact with the barrier layer and a second one of the CoFeB layers has a thickness that is less than the first one of the CoFeB layers, wherein the contact between the first one of the CoFeB layers and the barrier layer is configured to reduce hysteresis in the MR element; and
         depositing two or more spacer layers, wherein the CoFeB layers and the spacer layers alternate to form a multilayered free layer structure.

15. The method of claim 14, wherein manufacturing the magnetic field sensor comprises manufacturing the magnetic field sensor as an angle sensor or a current sensor.

16. The method of claim 14, wherein the first one of the CoFeB layers in direct contact with the barrier layer has a thickness of about 0.5 nanometers to about 1 nanometers.

17. The method of claim 14, wherein the alternating CoFeB layers and spacer layers are configured to increase output amplitude of the MR element.

18. The method of claim 14, wherein the depositing of two or more CoFeB layers comprises depositing four CoFeB layers and the depositing of two or more spacer layers comprises depositing four spacer layers.

19. The method of claim 14, wherein the depositing of two or more CoFeB layers comprises depositing two CoFeB layers and the depositing of two or more spacer layers comprises depositing two spacer layers.

20. The method of claim 14, wherein the spacer layers have a thickness of about 0.1 nanometers to about 0.2 nanometers.

21. The method of claim 14, wherein the CoFeB layers have a thickness of about 0.5 nanometers to about 1 nanometers.

22. The method of claim 14, further comprising:
    forming a cap layer; and
        forming a seed layer, wherein the reference layer is formed between the seed layer and the barrier layer, and wherein forming the free layer comprises forming the free layer between the barrier layer and the cap layer.

\* \* \* \* \*